(12) United States Patent
Kubota et al.

(10) Patent No.: US 6,513,938 B2
(45) Date of Patent: Feb. 4, 2003

(54) MULTI-DISPLAY DEVICE AND MULTI-DISPLAY SYSTEM

(75) Inventors: Akihiro Kubota, Kokubunji (JP); Yasuhiro Komiya, Hino (JP); Masaki Higurashi, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/803,710

(22) Filed: Mar. 9, 2001

(65) Prior Publication Data

US 2001/0022651 A1 Sep. 20, 2001

(30) Foreign Application Priority Data

Mar. 17, 2000 (JP) .................................... 2000-076790

(51) Int. Cl.$^7$ ............................................. G03B 21/26
(52) U.S. Cl. ........................................ 353/94; 353/30
(58) Field of Search ................................ 353/29, 30, 37, 353/70, 79, 10, 11, 48, 82, 83, 94

(56) References Cited

U.S. PATENT DOCUMENTS

| | | | | |
|---|---|---|---|---|
| 5,902,030 A | * | 5/1999 | Blanchard | 353/30 |
| 6,017,123 A | * | 1/2000 | Bleha et al. | 353/30 |
| 6,362,797 B1 | * | 3/2002 | Dehmlow | 345/32 |

FOREIGN PATENT DOCUMENTS

| | | |
|---|---|---|
| JP | 3-53288 | 3/1991 |
| JP | 5-103286 | 4/1993 |
| JP | 6-169444 | 6/1994 |
| JP | 9-211386 | 8/1997 |

\* cited by examiner

Primary Examiner—Russell Adams
Assistant Examiner—Andrew Sever
(74) Attorney, Agent, or Firm—Straub & Pokotylo; John C. Pokotylo (57) ABSTRACT

The present invention provides a multi-display device that has a plurality of projectors and constructs one image as a whole. Partial images projected on a screen from the projectors overlap to have the edges thereof superposed on edges of adjoining partial images in shared fields on the screen. A sheet interceptor intercepts part of light to be projected on a shared field so that the luminance level in the shared field will agree with the luminance levels in the other fields except the shared fields. An interceptor portion of the sheet interceptor, which intercepts light from the right-hand side of a range on the screen within which a partial image is projected, can be displaced horizontally relative to an interceptor portion thereof that intercepts light from the left-hand side thereof. Likewise, an interceptor portion of the sheet interceptor that intercepts light from the upper side of the projected range can be displaced vertically relative to an interceptor portion thereof that intercepts light from the lower side thereof.

13 Claims, 8 Drawing Sheets

MULTI-DISPLAY DEVICE AND MULTI-DISPLAY SYSTEM

This application claims benefit of Japanese Application No. 2000-076790 filed in Japan on Mar. 17, 2000, the contents of which are incorporated by this reference.

BACKGROUND OF THE INVENTION

1. Field of the Invention

The present invention relates to a multi-display device in which partial images projected from a plurality of image projecting means are arranged to construct one image as a whole, and a multi-display system.

2. Description of the Related Art

Various types of multi-display devices that use a plurality of image display devices serving as image projecting means to display one image have been proposed in the past. For example, Japanese Unexamined Patent Publications Nos. 5-103286, 3-53288, 9-211386, and 6-169444 describe such multi-display devices.

Figure 1:
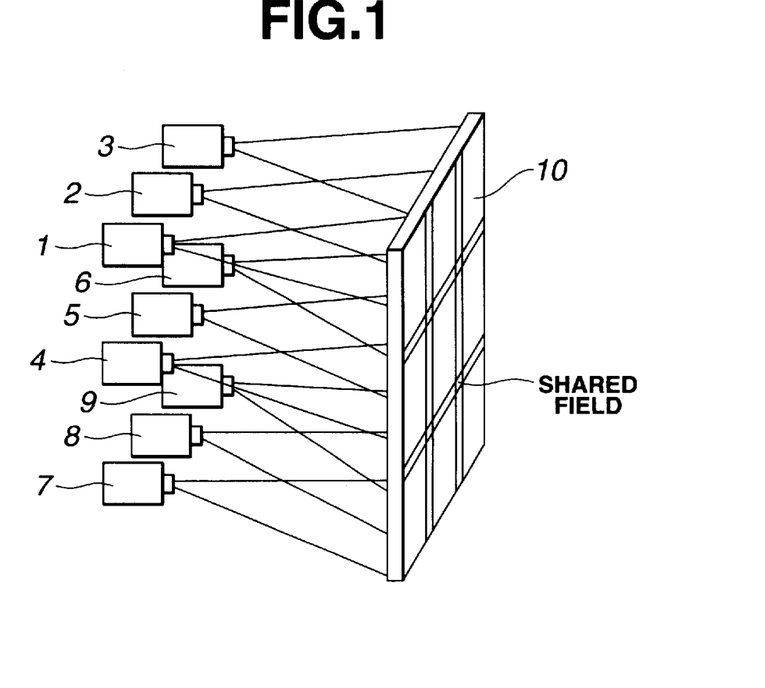
FIG. 1 is a perspective view schematically showing the structure of a multi-display device in accordance with a first embodiment of the present invention.

In the conventional multi-display devices, images projected from the plurality of image display devices overlap to have their edges superposed on adjoining edges in shared fields on a screen (see FIG. 1 concerned with an embodiment of the present invention). A sheet interceptor for intercepting light from the edge of a range on the screen within which a projector project an image is interposed between the image display device (projector) and the screen, whereby an amount of light is decreased for fear the luminance levels in the shared fields may get higher.

However, according to the aforesaid prior arts, there is difficulty in arranging sheet interceptors so that they can intercept light rays, which overlap and are projected from the plurality of image display devices, by an equal amount. Even if the sheet interceptors are aligned once in the course of manufacturing, when a lamp must be replaced with a new one thereafter, the image display devices may be moved or dismounted from the multi-display device. In this case, the positional relationships of the sheet interceptors to the image display devices must be adjusted again. This poses a problem in that the adjustment is time-consuming.

Figure 14:
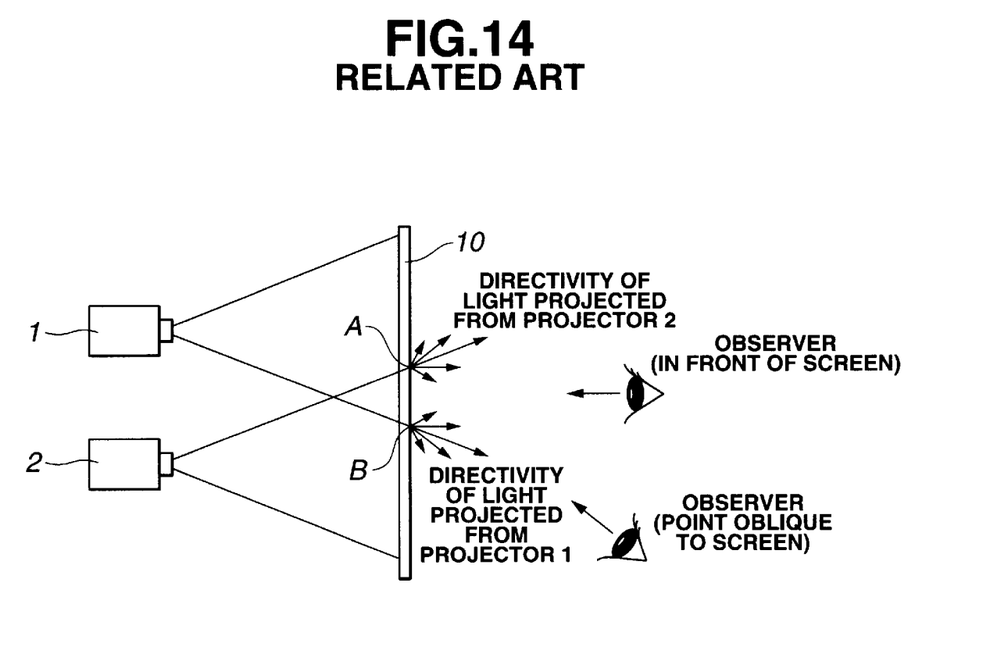
FIG. 14 shows a phenomenon that occurs in related arts and that the luminance levels of images projected on a screen from projectors arranged parallel to one another are sensed different when the screen is seen from a point oblique to the screen because of the directivity of light.

Moreover, as shown in FIG. 14, when images are projected from a plurality of projectors 1 and 2 so that the ray axes of light representing the images will be perpendicular to the major surface of a screen 10, the directivity of light reaching a shared field on the screen, in which the edges of partial images projected from the projectors 1 and 2 are superposed on each other is different between light projected from the projector 1 and light projected from the projector 2.

When such light is diffused on the diffusing surface of the screen (see FIG. 14 showing diffused light at point A and diffused light at point B), light diffused in the same direction as incident light is the largest amount of light. The amount of diffused light decreases with an increase in its angle with respect to the direction of incidence. An observer looking at the screen from a point in front of the screen will not sense that the luminance of the image becomes unnaturally discontinuous in the shared field on the screen. However, an observer looking at the screen from a point oblique to the screen will sense that the amount of light projected from the projector 2 is smaller than that projected from the projector 1, and that the luminance of the image becomes unnaturally discontinuous in the shared field.

SUMMARY OF THE INVENTION

Accordingly, an object of the present invention is to provide a multi-display device making it possible to observe an image, which consists of a plurality of partial images, with an almost equal luminance level over a screen including shared fields, and a multi-display system.

Briefly, according to the present invention, there is provided a multi-display device including a plurality of image projecting means and a light level adjusting means. The plurality of image projecting means projects partial images on a screen so as to construct one image as a whole. The partial images overlap to have the edges thereof superposed on edges of adjoining partial images in shared fields on the screen. The light level adjusting means adjusts an amount of light to be projected on the shared fields so that the luminance levels in the shared fields will substantially agree with the luminance levels in the other fields except the shared fields. The light level adjusting means displaces a light level adjustment range within which an amount of light representing one edge of a partial image to be projected is adjusted relative to an amount of light representing the other edge of the partial image.

According to the present invention, there is provided a multi-display system including a multi-display device, an imaging means, a luminance detecting means, a magnitude-of-displacement calculating means, and a control means. The multi-display device includes a plurality of image projecting means and a light level adjusting means. The plurality of image projecting means projects partial images on a screen so as to construct one image as a whole. The partial images overlap to have the edges thereof superposed on edges of adjoining partial images in shared fields on the screen. The light level adjusting means adjusts an amount of light to be projected on the shared fields so that the luminance levels in the shared fields will substantially agree with the luminance levels in the other fields except the shared fields. The light level adjusting means displaces a light level adjustment range within which an amount of light representing one edge of a partial image to be projected is adjusted relative to an amount of light representing the other edge of the partial image. The imaging means picks up the image displayed on the screen of the multi-display device. The luminance detecting means samples a luminance signal from an image signal output from the imaging means, and detects the sizes of the shared fields and the luminance levels in the shared fields. The magnitude-of-displacement calculating means calculates a magnitude of displacement, by which the light level adjusting means should displace the light level adjustment range, according to an output of the luminance detecting means. The control means extends control so that the light level adjusting means can displace the light level adjustment range by the magnitude of displacement calculated by the magnitude-of-displacement calculating means.

Furthermore, according to the present invention, there is provided an adjusting method for a multi-display device that includes a plurality of image projecting means and a light level adjusting means. The plurality of image projecting means project partial images on a screen so as to construct one image as a whole. The projected partial images overlap to have the edges thereof superposed on edges of adjoining partial images in shared fields on the screen. The light level adjusting means adjusts an amount of light to be projected on the shared fields so that the luminance levels in the shared fields will substantially agree with the luminance levels in fields other than the shared fields. The light level adjusting means displaces a light level adjustment range within which an amount of light representing one edge of a partial image is adjusted relative to an amount of light representing the other edge thereof. The adjusting method comprises an outputting step, a detecting step, a calculating step, and a control step. At the outputting step, the image displayed on the screen of the multi-display device is picked up in order to produce an image signal. At the detecting step, a luminance signal is sampled from the image signal in order to detect the sizes of the shared fields and the luminance levels in the shared fields. At the calculating step, a magnitude of displacement by which the light level adjusting means included in the multi-display device should displace the light level adjustment range is calculated based on the detected information of the sizes of the shared fields and luminance levels therein. At the control step, control is extended so that the light level adjusting means can displace the light level adjustment range by the magnitude of displacement. image projecting means projects partial images on a screen so as to construct one image as a whole. The projected partial images overlap to have the edges thereof superposed on edges of adjoining partial images in shared fields on the screen. The light level adjusting means adjusts an amount of light to be projected on the shared fields so that the luminance levels in the shared fields will substantially agree with the luminance levels in the other fields except the shared fields. The light level adjusting means displaces a light level adjustment range within which an amount of light representing one edge of a partial image is adjusted relative to an amount of light representing the other edge thereof. The adjusting method comprises an outputting step, a detecting step, a calculating step, and a control step. At the outputting step, the image displayed on the screen of the multi-display device is picked up in order to produce an image signal. At the detecting step, a luminance signal is sampled from the image signal in order to detect the sizes of the shared fields and the luminance levels in the shared fields. At the calculating step, a magnitude of displacement by which the light level adjusting means included in the multi-display device should displace the light level adjustment range is calculated based on the detected information of the sizes of the shared fields and luminance levels therein. At the control step, control is extended so that the light level adjusting means can displace the light level adjustment range by the magnitude of displacement.

These objects and advantages of the present invention will become further apparent from the following detailed explanation.

DESCRIPTION OF THE PREFERRED EMBODIMENTS

Embodiments of the present invention will be described with reference to the drawings below.

FIG. 1 to FIG. 4 show a first embodiment of the present invention. FIG. 1 is a perspective view schematically showing the structure of a multi-display device.

The multi-display device has nine projectors 1 to 9, which serve as image projecting means, arranged in threes in rows and columns. A transmissive screen 10 is located at a position at which the projectors 1 to 9 project images. Ranges on the screen 10 within which the projectors 1 to 9 project images overlap to have their edges superposed on edges of adjoining ranges.

Figure 2:
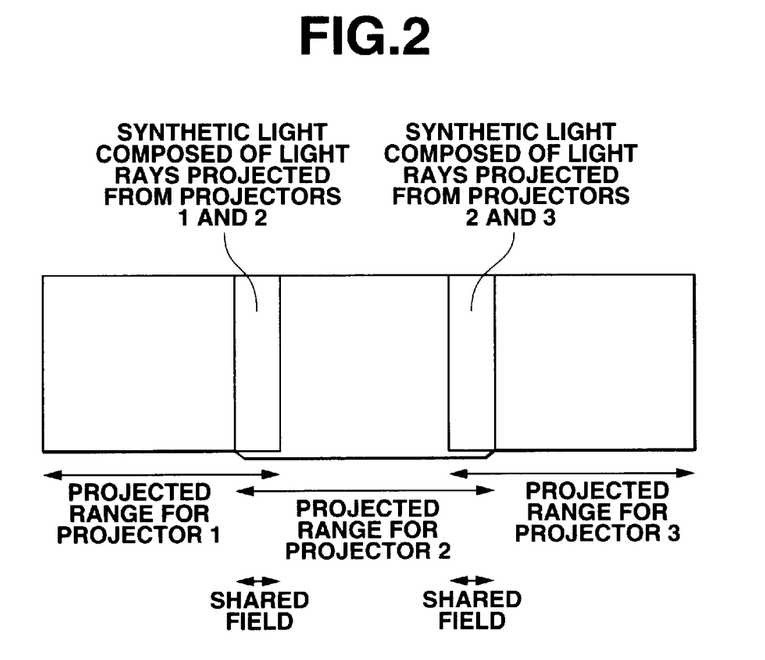
FIG. 2 show ranges on a screen within which light is projected from three projectors juxtaposed sideways in accordance with the first embodiment, and shared fields on the screen.

It is FIG. 2 that shows the ranges on the screen 10 within which the projectors 1 to 3 project images, and fields on the screen shared by the ranges (shared fields). FIG. 2 shows the ranges within which the three projectors juxtaposed sideways project images and the shared fields.

Sideways, the range within which the projector 1 projects an image and the range within which the projector 2 projects an image overlap to have their edges superposed on one another in the shared field. Moreover, the range within which the projector 3 projects an image and the projected range for the projector 2 overlap to have their edges superposed on each other in the shared field on the opposite side of the projected range for the projector 2.

In the multi-display device in which the above projected ranges are defined, unless some measures are taken, the luminance levels in the shared fields become almost twice as large as the luminance levels in fields other than the shared fields. For this reason, sheet interceptors are included for dimming light rays projected on the shared fields from the projectors, which is shown in FIG. 3.

Figure 3:
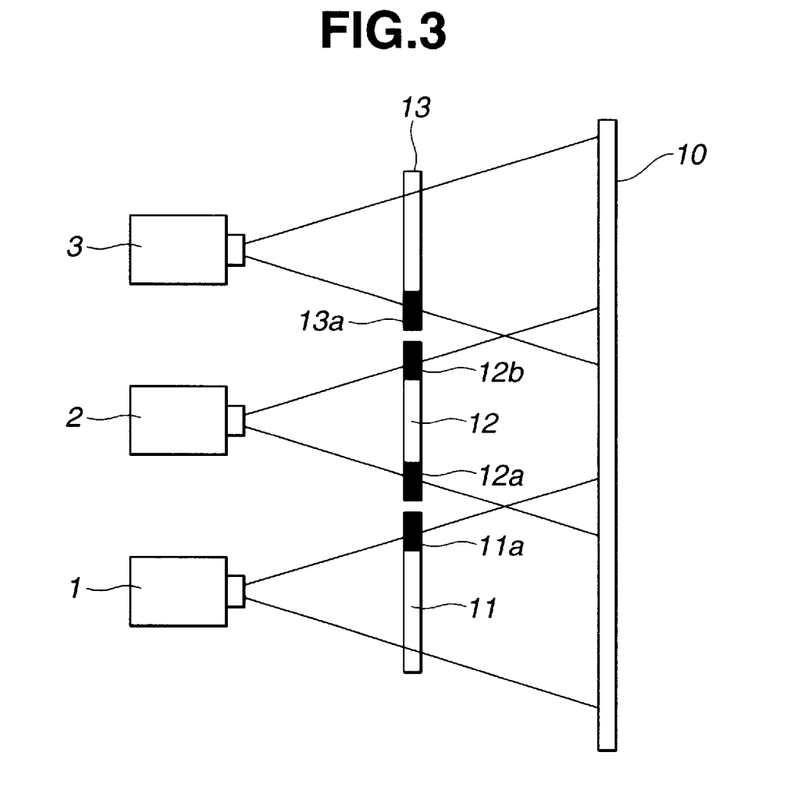
FIG. 3 is a plan view showing light rays that are projected on the shared fields and dimmed by sheet interceptors employed in the first embodiment.

FIG. 3 is a plan view showing the light rays projected on the shared fields and dimmed by the sheet interceptors.

When the projectors 1 to 3 are arranged as shown in FIG. 3, the projector 2 shares the same field, which is defined along one side of the projected range for the projector 2, with the projector 1. The projector 2 shares the same field, which is defined along the other side thereof, with the projector 3.

Sheet interceptors are, as illustrated, located on the paths of the light rays reaching the shared fields.

Specifically, a sheet interceptor 11 serving as a light level adjusting means for adjusting an amount of light projected from the projector 1 has an interceptor portion 11a located on the path of light reaching the field shared with the projected range for the projector 2.

A sheet interceptor 12 serving as a light level adjusting means for adjusting an amount of light projected from the projector 2 has an interceptor portion 12a located on the path of light reaching the field shared with the projected range for the projector 1. Moreover, the sheet interceptor 12 has an interceptor portion 12b located on the path of light reaching the field shared with the projected range for the projector 3.

Furthermore, a sheet interceptor 13 serving as a light level adjusting means for adjusting an amount of light projected from the projector 3 has an interceptor portion 13a located on the path of light reaching the field shared with the projected range for the projector 2.

The sheet interceptors 11, 12, and 13 are interposed between the projectors 1, 2, and 3 respectively and the screen 10 and located on the light paths. The positions of the sheet interceptors lie on a non-focal plane. The effect of interception achieved by the interceptors is recognized as gradually intercepted light that falls on the screen 10 located on a focal plane.

Assuming that the luminance levels in unshared fields allocated to the projectors 1 and 2 are 1 that is a relative value, an image projected from the projector 1 exhibits a luminance level of approximately 1 at a position in the field shared by the projectors 1 and 2 near an unshared field allocated to the projector 1, on the other hand, at the same position in the shared field, an image projected from the projector 2 exhibits a luminance level of approximately 0. Since the images projected from the projectors 1 and 2 overlap to have their edges superposed on each other in the shared field, the superposed edges are displayed as an image portion that exhibits a luminance level of nearly 1 at the above position.

Likewise, at a position in the field shared by the projectors 1 and 2 near the unshared field allocated to the projector 2, an image projected from the projector 1 exhibits a luminance level of approximately 0, while an image projected from the projector 2 exhibits a luminance level of approximately 1. The images overlap to have their edges superposed on each other, and the superposed edges are displayed as an image portion that exhibits a luminance level of nearly 1 at the above position.

At a position nearly in the center of the field shared by the projectors 1 and 2, an image projected from the projector 1 exhibits a luminance level of approximately 0.5, and an image projected from the projector 2 exhibits a luminance level of approximately 0.5. The images overlap to have their edges superposed on each other, and the superposed edges are displayed as an image portion that exhibits a luminance level of nearly 1 at the above position.

Consequently, in the shared field, the edges of images projected from adjoining projectors are joined smoothly. Moreover, the luminance level in the shared field is nearly the same as the luminance levels in the unshared fields allocated to the projectors. This makes it possible to observe a smooth image devoid of discontinuity.

At this time, the shared field is determined with a space between projectors or angles at which the projectors are placed. The positions of the interceptor portions of the sheet interceptors must be determined based on how the projectors are arranged. According to the present embodiment, part of the interceptor portions included in the sheet interceptors is made movable.

Figure 4:
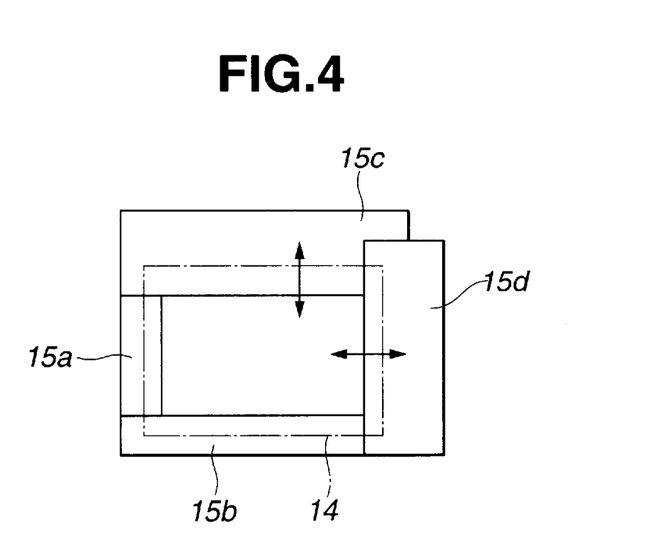
FIG. 4 is a front view showing the structure of a sheet interceptor for intercepting light from four edges of a rectangular projected range in the first embodiment.

The structure of a sheet interceptor having movable interceptor portions will be described with reference to FIG. 4. FIG. 4 is a front view showing the structure of a sheet interceptor for intercepting light from four sides of a rectangular projected range.

The sheet interceptor shown in FIG. 4 is associated with the projector 5 included in the projectors shown in FIG. 1.

An image projected from the projector 5 overlaps an image projected from the projector 2 such that the upper edge thereof is superposed on the lower edge of the image projected on a shared field on the screen from the projector 2. The image projected from the projector 5 overlaps an image projected from the projector 8 such that its lower edge is superposed on the upper edge of the image projected on a shared field from the projector 8. The image projected from the projector 5 overlaps an image projected from the projector 6 such that its right edge is superposed on the left edge of the image projected on a shared field from the projector 6. Moreover, the image projected from the projector 5 overlaps an image projected from the projector 4 such that its left edge is superposed on the right edge of the image projected on a shared field from the projector 4. A sheet interceptor associated with the projector 5 is therefore designed to be able to intercept light from the four sides of a projected range within which a rectangular image is projected.

Specifically, for example, an interceptor portion 15a that shields the left side of a projected range 14 for the projector 5 and an interceptor portion 15b that shields the lower side therof are joined to have an L shape. In contrast, an interceptor portion 15c that shields the upper side of the projected range and is formed with a rectangular plate member, and in interceptor portion 15d that shields the right side thereof and is formed therewith are not joined, but are made movable.

The interceptor portion 15c is vertically movable, whereby a space between the interceptor portions 15c and 15b can be varied.

The interceptor portion 15d is laterally movable, whereby a space between the interceptor portions 15d and 15a can be varied.

In the example shown in FIG. 4, only one of the interceptor portions that shield two opposed sides of the projected range for the projector 5 is made movable. Alternatively, all the interceptor portions that shield the four sides of the projected range for the projector 5 may be made movable.

Moreover, sheet interceptors associated with projectors that share fields with three adjoining projectors or less, that is, the sheet interceptors associated with the projectors 1, 2, 3, 4, 6, 7, 8, and 9 shown in FIG. 1 have less necessary interceptor portions, but are otherwise similar to the sheet interceptor shown in FIG. 4. Furthermore, the sheet interceptors are designed to intercept light completely. Alternatively, the sheet interceptors may be realized with dim filters each of which has the transmittance thereof gradually increased from the edge thereof to the center thereof, or dim filters each of which has the transmittance thereof stepwise increased from the edge thereof to the center thereof.

According to the first embodiment, since (interception portions of) the sheet interceptors are made movable, the width of a shared field can be adjusted readily. Consequently, the luminance level in the shared field can be adjusted. Therefore, the luminance on the whole screen can be readily made equal. This results in a multi-display device capable of displaying a high-quality image that exhibits in a shared field a luminance level continuous to a luminance level in an unshared field.

Figure 5:
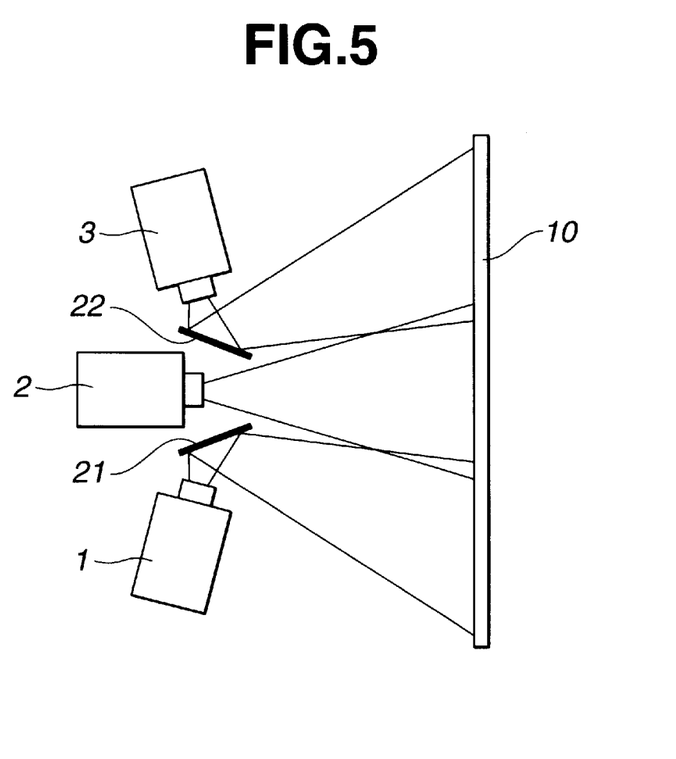
FIG. 5 is a plan view showing an arrangement for improving the directivity of light incident on a screen employed in a second embodiment of the present invention.

FIG. 5 to FIG. 8 show a second embodiment of the present invention. FIG. 5 is a plan view showing an arrangement for improving the directivity of light incident on a screen. In the second embodiment, the same reference numerals are assigned to components identical to those in the first embodiment. Differences from the first embodiment will be described mainly.

As mentioned above, light diffused on the screen 10 exhibits directivity that depends on the direction of incident light. Assuming that projectors are arranged so that the optical axes thereof will be parallel to one another, the edges of images projected from the projectors are superposed on one another in shared fields on the screen. When the screen is seen from a point oblique to the screen, the luminance level in the shared field may be sensed to be discontinuous to the luminance level in an unshared field.

What has been devised in efforts to resolve the above disadvantage is the arrangement of projectors shown in FIG. 5.

As illustrated, the projector 2 located in the center projects an image in a direction nearly perpendicular to the major surface of the screen 10.

Reflecting mirrors 21 and 22 are located near the lens of the projector 2 through which an image is projected. One of the reflecting mirrors, that is, the reflecting mirror 21 reflects an image projected from the projector 1. The other reflecting mirror 22 reflects an image projected from the projector 3.

Specifically, an image projected from the projector 1 is projected on the screen 10 after reflected from the reflecting mirror 21. At this time, a predetermined range on the screen within which the image is projected from the projector 1 and a predetermined range thereon within which an image is projected from the projector 2 share a field on the screen.

Likewise, an image projected from the projector 3 is projected on the screen after reflected from the reflecting mirror 22. At this time, a predetermined range on the screen within which the image is projected from the projector 3 and the predetermined range on the screen within which the image is projected from the projector 2 share a field on the screen.

When the projectors 1 and 3 and the reflecting mirrors 21 and 22 are arranged as mentioned above, light projected from the projector 1 and light projected from the projector 2 fall on the screen in nearly the same directions. Light projected from the projector 3 and light projected from the projector 2 fall on the screen 10 in nearly the same directions. Therefore, the directivity of light diffused from the shared field will not become very discontinuous to the directivity of light diffused from any other unshared field. Not only when the screen is seen from a point in front of the screen, but also when it is seen from a point oblique to the screen, the luminance on the screen will not be sensed to vary.

Figure 6:
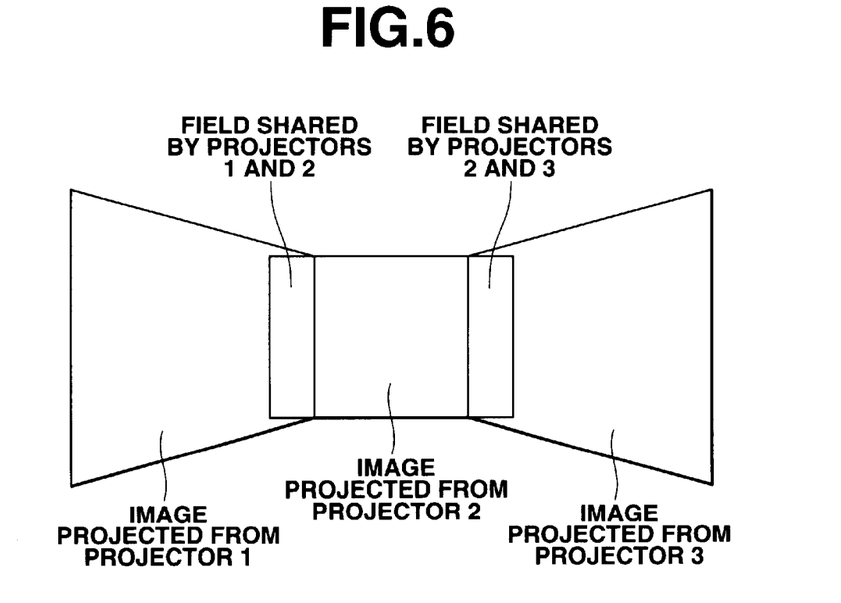
FIG. 6 shows images projected on the screen by projectors arranged as show in FIG. 5 and employed in the second embodiment.

FIG. 6 shows images projected from the projectors arranged as shown in FIG. 5 on the screen.

When the projectors 1, 2, and 3 arranged as shown in FIG. 5 project rectangular images on the screen 10, the image projected from the projector 2 remains rectangular. However, the images projected from the projectors 1 and 3 have a trapezoidal shape because they are projected obliquely.

Figure 7:
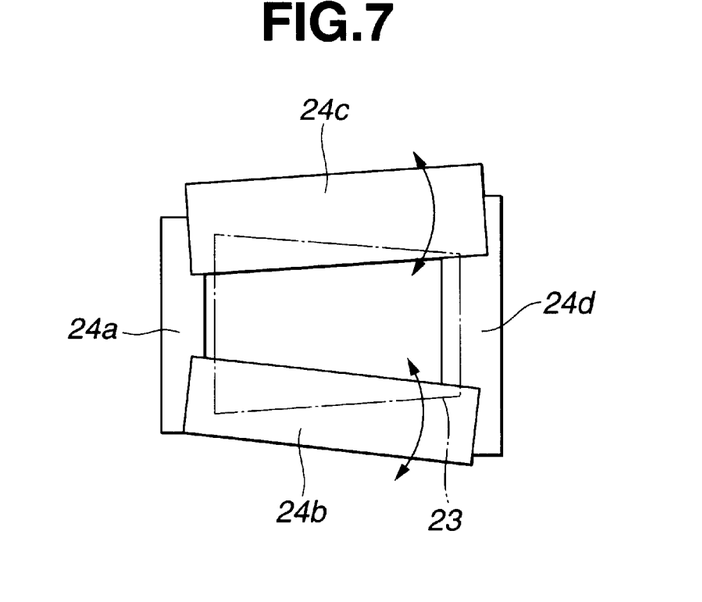
FIG. 7 is a front view showing the structure of a sheet interceptor for intercepting light projected from a projector from a direction obliquely crossing the screen so that the light will be projected as a rectangular image.

Therefore, a sheet interceptor like the one shown in FIG. 7 is adopted for interception. FIG. 7 is a front view showing the structure of a sheet interceptor for intercepting light, which is projected from a projector and falls on the screen from a direction obliquely crossing the screen, so that the light will be projected as a rectangular image.

As shown in FIG. 7, a pair of interceptor portions 24a and 24d opposed to each other are intended to intercept light from the vertical sides of a projected range 23 for the projector 1. One of the interceptor portions, that is, the interceptor portion 24a intercepts light from a field outside the projected range 23 within which an image projected from the projector 1 is synthesized with another image, that is, a field on the opposite side of the projected range 23 relative to a projected range for the projector 2. The field is not a shared field and therefore need not be intercepted from light. The other interceptor portion 24d intercepts light reaching a field shared with the projected range for the projector 2.

Moreover, the other pair of interceptor portions 24b and 24c that are opposed to each other intercepts light from the sides of the projected range 23 for the projector 1 which extend substantially horizontally. One of the interceptor portions, that is, the interceptor portion 24b intercepts light from the lower side of the projected range 23, and the other interceptor portion 24c intercepts light from the upper side thereof.

At this time, the interceptor portions 24b and 24c are designed to be displaceable in a direction of pivoting. The positions of the interceptor portions 24b and 24c can be adjusted so that intercepted light can be projected as an image like the one shown in FIG. 8.

Figure 8:
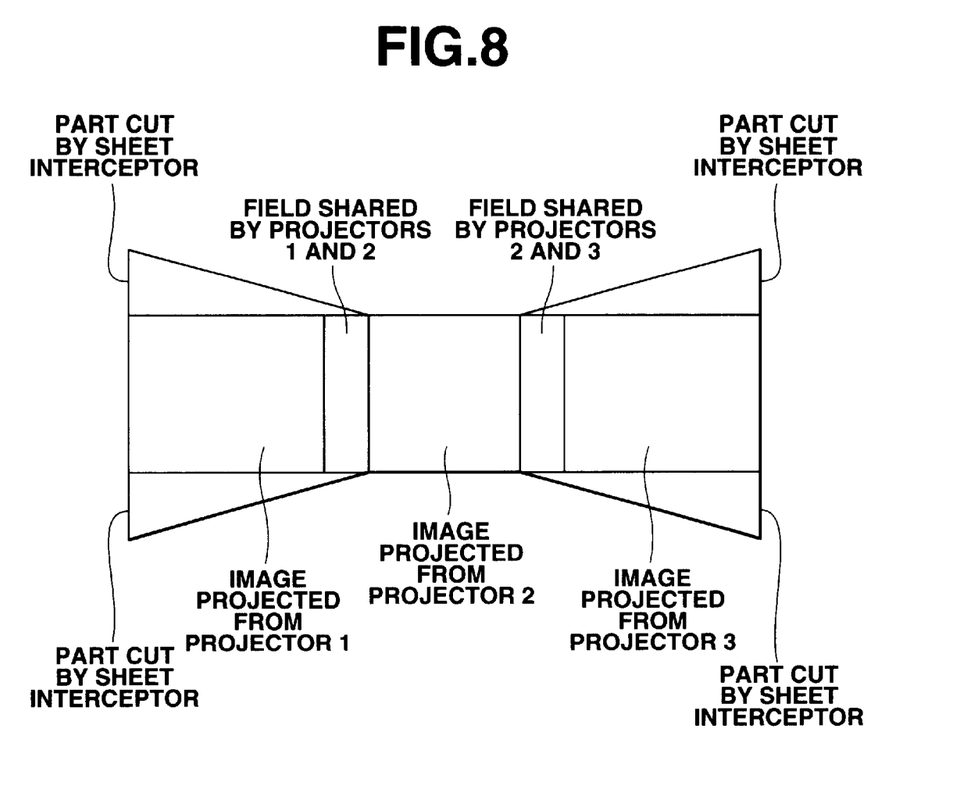
FIG. 8 shows the projected images shown in FIG. 6 after they are intercepted using sheet interceptors like the one shown in FIG. 7 in the second embodiment.

FIG. 8 shows the projected images shown in FIG. 6 after they are intercepted using sheet interceptors like the one shown in FIG. 7.

A sheet interceptor composed of the interceptor portions 24a, 24b, 24c, and 24d is located on a light path between the projector 1 and the screen 10. After passing through the sheet interceptor, light further spreads towards the screen 10. In consideration of this fact, the space between the interceptor portions 24b and 24c is, as shown in FIG. 7, adjusted to be narrower on the left side thereof and wider on the right side thereof. Consequently, a range on the screen 10 within which light is projected without being intercepted becomes rectangular as shown in FIG. 8.

At this time, images displayed on liquid crystal display panels or the like included in a plurality of projectors are subjected to conversion so that images projected on a screen without being intercepted will be the same as the partial images the projectors must project. Moreover, since an image projected from the projector 1 or 3 is reflected from the reflecting mirror 21 or 22, an image displayed in the liquid crystal display panel or the like included in the projector is reversed.

As mentioned above, when reflecting mirrors are employed, a mask for intercepting rim rays or a mask for varying a reflectance may be placed on the reflecting mirrors. When such a mask for varying a reflectance is adopted, the mask may be designed to cause the reflectance of a reflecting mirror to continuously or stepwise increase from the edge of the mirror towards the center thereof.

Moreover, the above reflecting mirrors may be designed to be able to pivot. In this case, the position of a shared field can be readily adjusted by adjusting the angle of the reflecting mirror.

The second embodiment provides nearly the same advantages as the first embodiment. In addition, the discontinuity in luminance attributable to the fact that an amount of light diffused from the screen depends on the direction of diffusion is minimized. Even when the screen is seen from a point oblique thereto, an image whose luminance is smoothly continuous can be viewed.

Figure 9:
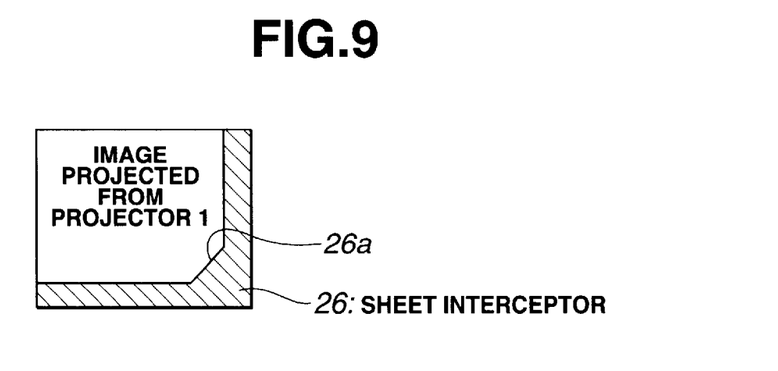
FIG. 9 is a front view showing the structure of a sheet interceptor that proves effective when images projected from four projectors overlap to have their corners superposed on one another, and that is employed in a third embodiment of the present invention.
Figure 10:
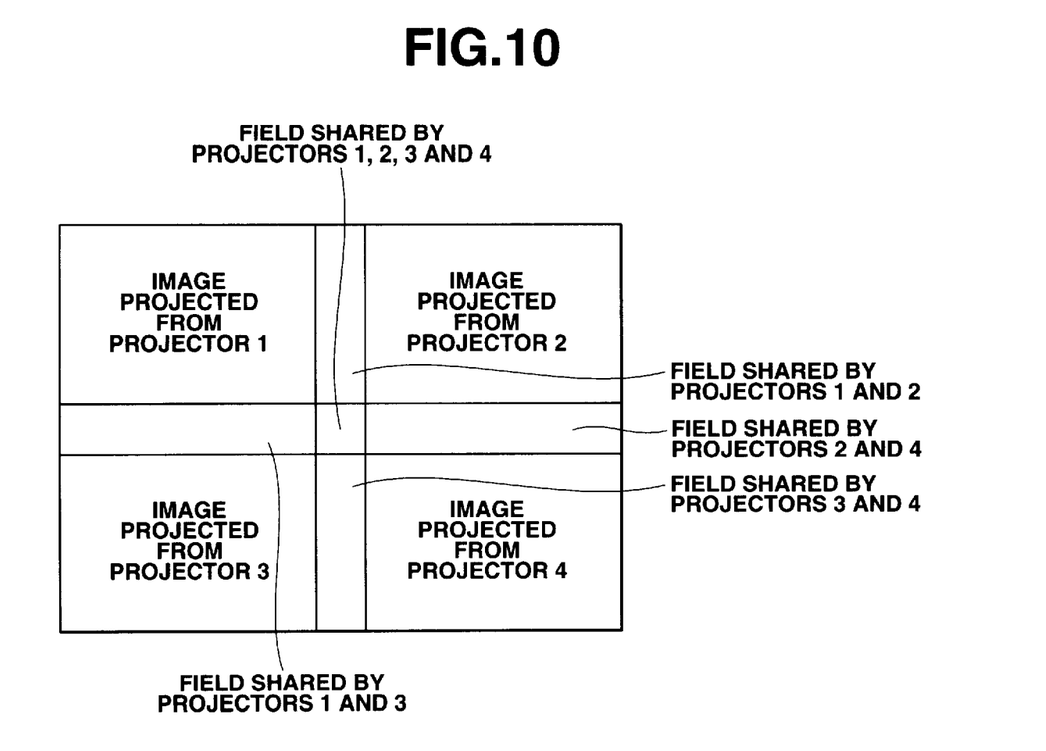
FIG. 10 shows the images projected from the four projectors employed in the third embodiment.

FIG. 9 and FIG. 10 show the third embodiment of the present invention. FIG. 9 is a front view showing the structure of a sheet interceptor that proves effective when images projected from four projectors overlap to have their corners superposed on one another. FIG. 10 shows images projected on a screen from the four projectors.

In the third embodiment, the same reference numerals are assigned to components identical to those in the first and second embodiments. The description of the components will be omitted, and differences alone will be described below.

When projectors are vertically and laterally arranged in a planar fashion, images projected from two or more projectors overlap. For brevity's sake, a discussion will be made on the assumption that the number of projectors is four. For example, as shown in FIG. 10, an image projected from the projector 1 is displayed in the left upper quarter of the screen, and an image projected from the projector 2 is displayed on the right upper quarter thereof. An image projected from the projector 3 is displayed on the left lower, and an image projected from the projector 4 is displayed on the right lower quarter thereof. Four fields on the screen are shared by two projectors, and one field thereon is shared by the four projectors.

In other words, the image projected from the projector 1 and the image projected from the projector 2 overlap to have their edges superposed on each other in the shared field. The image projected from the projector 1 and the image projected from the projector 3 overlap to have their edges superposed on each other in the shared field. The image projected from the projector 2 and the image projected from the projector 4 overlap to have their edges superposed on each other in the shared field. The image projected from the projector 3 and the image projected from the projector 4 overlap to have their edges superposed on each other in the shared field. Moreover, the four images overlap to have their corners superposed on one another in the shared field.

At this time, the luminance level in the shared field in which the four images have their corners superposed on one another may be higher than the luminance levels in the other fields. FIG. 9 shows the structure of a sheet interceptor for making the luminance level in the shared field almost equal to the luminance levels in the other fields.

A sheet interceptor 26 serving as a light level adjusting means is associated with, for example, the projector 1. The sheet interceptor 26 is shaped substantially like a letter L in order to intercept light from the field shared with the projector 3 and light from the field shared with the projector 2. The L-shaped sheet interceptor has an intercepting region 26a, which is shaped substantially like a triangle, formed as a region defined with two edges that meet at right angles.

Owing to the intercepting region 26a, an image whose luminance is nearly equal can be displayed on the screen as shown in FIG. 10.

The third embodiment provides nearly the same advantages as the first and second embodiments. In addition, when the luminance level in a field shared by three or more projectors becomes too high, the luminance level can be optimized in order to make it possible to view an image whose luminance is nearly equal all over the screen.

Figure 11:
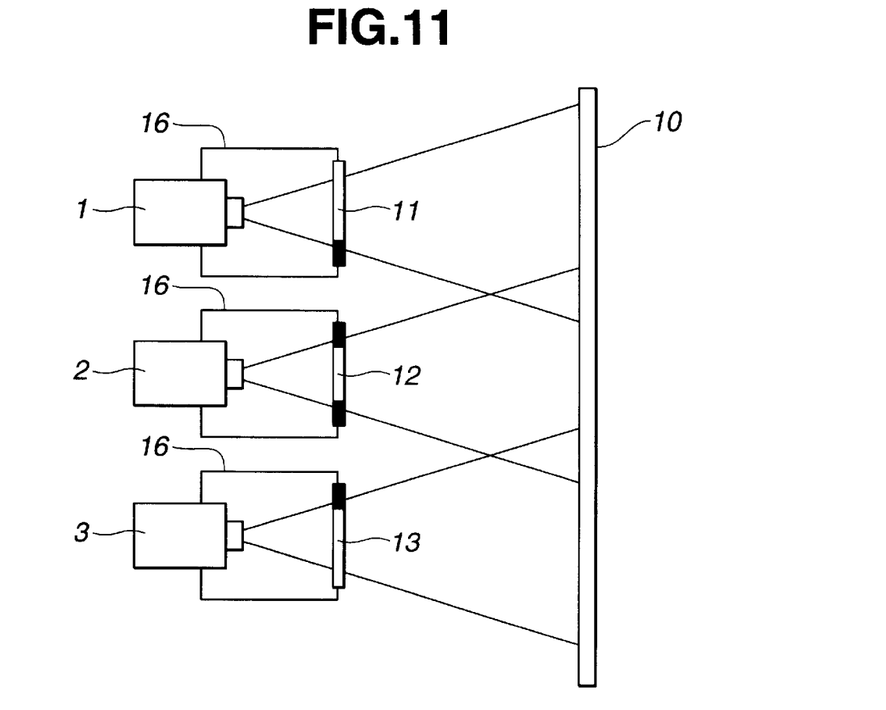
FIG. 11 is a sectional plan view showing an arrangement of projectors integrated with sheet interceptors so as to maintain the predetermined positional relationships between the projectors and sheet interceptors in accordance with a fourth embodiment of the present invention.

FIG. 11 shows the fourth embodiment of the present invention, and is a sectional plan view showing a structure that has projectors and sheet interceptors integrated so that each pair of the projector and sheet interceptor will maintain a predetermined positional relationship. In the fourth embodiment, the same reference numerals are assigned to components identical to those in the first to third embodiments. The description of the components will be omitted, and differences alone will be described below.

Each projector has a transmissive liquid crystal display panel, on which an image is displayed, incorporated therein. An illuminating means such as a lamp is used to illuminate the transmissive liquid crystal display panel from the back of the panel. In the thus-structured projector, after the lamp is used for a long period of time, the luminance offered by the lamp may be degraded or the lamp may not be lit any longer. The lamp may therefore have to be replaced with a new one.

At this time, the projector is dismounted from a multi-display device, and the lamp incorporated in the projector is replaced with a new one. After the lamp is replaced with the new one, the projector is mounted in the multi-display device again. However, the positional relationship between the projector and a sheet interceptor may be inadvertently and undesirably changed, even delicately. In this case, the positional relationship between the projector and the sheet interceptor must be readjusted. It is therefore time-consuming to replace the lamp with a new one.

According to the structure shown in FIG. 11, a projector and a sheet interceptor are integrated into a casing for fear the positional relationship between the projector and sheet interceptor may be changed during replacement of the lamp.

Specifically, a projector 1 and a sheet interceptor 11, a projector 2 and a sheet interceptor 12, and a projector 3 and a sheet interceptor 13 are locked in casings 16 serving as locking means, so that their positional relationships will remain unchanged.

For dismounting a projector from the multi-display device, the projector and the sheet interceptor that are locked in the casing 16 are dismounted all together.

As mentioned above, each projector is integrated with an associated sheet interceptor. Alternatively, all projectors may be locked in the same casing together with all sheet interceptors so that the positional relationships among the projectors will remain unchanged.

The fourth embodiment provides nearly the same advantages as the aforesaid first to third embodiments do. In addition, the time required for adjustment to be performed after a lamp is replaced with a new one or any other repair is carried out can be reduced drastically.

Figure 12:
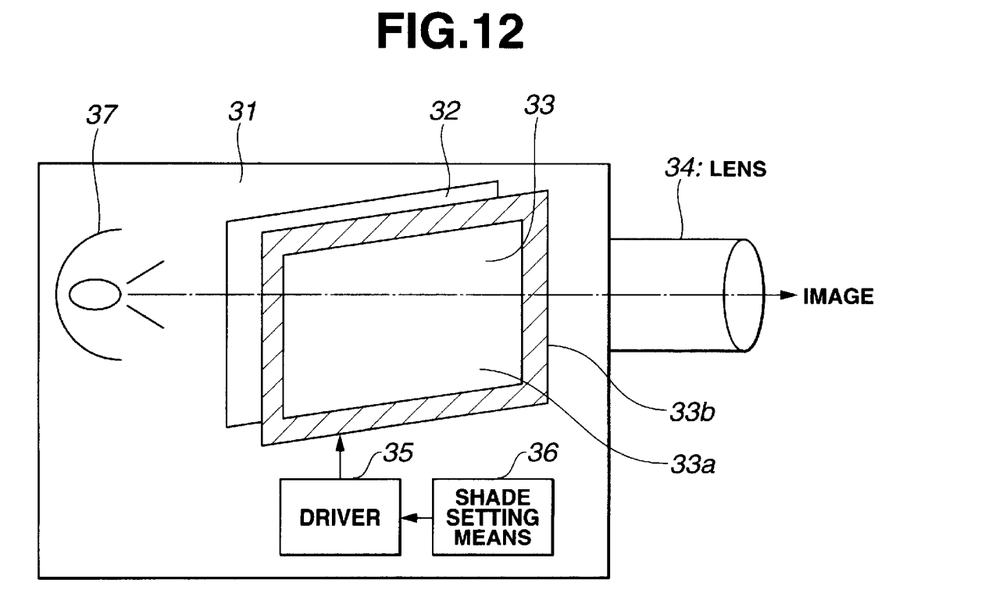
FIG. 12 shows a configuration for intercepting rim rays using a light level adjustment liquid crystal panel incorporated in a projector employed in a fifth embodiment of the present invention.

FIG. 12 shows the fifth embodiment of the present invention. A light level adjustment liquid crystal panel is incorporated in a projector in order to intercept light from the sides of a projected range on a screen. In the fifth embodiment, the same reference numerals are assigned to components identical to those in the first to fourth embodiments. The description of the components will be omitted, and differences alone will be described mainly.

As mentioned above, a sheet interceptor is interposed between each projector and a screen. The present invention is not limited to this mode. The sheet interceptor may be incorporated in each projector.

Specifically, a projector 31 serving as an image projecting means consists mainly of a transmissive liquid crystal display panel 32, a lamp 37, and a lens 34. The transmissive liquid crystal display panel 32 is a display device for displaying an image. The lamp 37 serves as an illuminating means for illuminating the transmissive liquid crystal display panel 32. The lens 34 serves as a projecting optical system through which an image displayed on the transmissive liquid crystal display panel 32 is projected. A light level adjustment liquid crystal panel 33 serving as a light level adjusting means for intercepting or dimming rim rays of light representing the image displayed on the transmissive liquid crystal display panel 32 is located on a light path linking the lamp 37 and lens 34, or more particularly, on a light path linking the transmissive liquid crystal display panel 32 and lens 34.

The light level adjustment liquid crystal panel 33 includes a transmitting section 33a for transmitting light nearly as it is, and an intercepting section 33b for adjusting an amount of transmitted light while located around the transmitting section 33a. The light level adjustment liquid crystal panel 33 is driven by a driver 35.

A shade setting means 36 sets a range from which light is intercepted by the intercepting section 33b, or sets a level of shade caused by interception. Set data is output to the driver 35, and the driver 35 controls the light level adjustment liquid crystal panel 33.

The fifth embodiment provides nearly the same advantages as the first to fourth embodiments do. Since a light level adjustment liquid crystal panel having an intercepting ability is incorporated in a projector, even when a lamp is replaced with a new one, the positional relationship between the lamp and a transmissive liquid crystal display panel will not be varied. An adjustment time can be reduced. Moreover, the adjustment can be achieved through electric control alone. Since mechanical control is unnecessary, an adjustment mechanism can be designed to have a simple structure. This leads to a compactly designed multi-display device.

Figure 13:
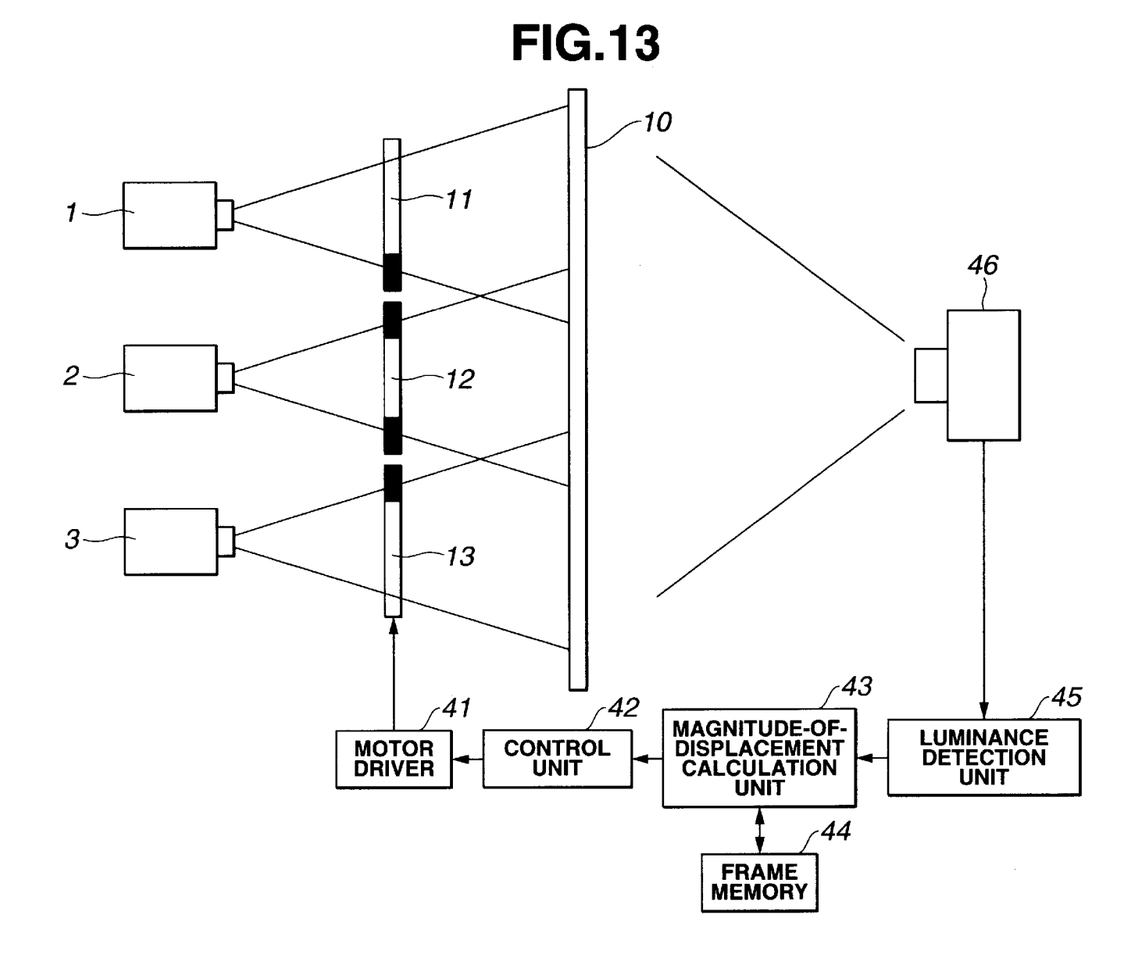
FIG. 13 is a block diagram showing the configuration of a multi-display system for adjusting luminance to be offered by a multi-display device in accordance with a sixth embodiment of the present invention.

FIG. 13 shows a sixth embodiment of the present invention, and is a block diagram showing the configuration of a multi-display system for adjusting luminance offered by a multi-display device. In the sixth embodiment, the same reference numerals are assigned to components identical to those in the first to fifth embodiments. The description of the components will be omitted, and differences alone will be described mainly.

In the foregoing multi-display device must have the positions of the sheet interceptors or the like adjusted at a factory before delivery or when a lamp is replaced with a new one. This is intended to make the luminance levels in shared fields equal to those in the other unshared fields. FIG. 13 shows the configuration for adjusting the luminance levels.

Partial images projected from projectors 1, 2, and 3 are converged on a screen 10 via sheet interceptors 11, 12, and 13 respectively.

An image on the screen 10 is picked up using, for example, a digital camera 46. A luminance detection unit 45 serving as a luminance detecting means samples a luminance signal from the image signal to detect the widths and positions of shared fields.

When the luminance on the whole screen is unequal, a magnitude-of-displacement calculation unit 43 serving as a magnitude-of-displacement calculating means calculates a magnitude of displacement while referencing data stored in a frame memory 44 according to an output of the luminance detection unit 45. Thus, an unequal luminance level is corrected. Herein, a magnitude of displacement is a measure indicating to what extent the sheet interceptors 11, 12, and 13 should be moved.

A control unit 42 serving as a control means drives a motor driver 41 according to the magnitude of displacement calculated by the magnitude-of-displacement calculation unit 43. The sheet interceptors 11, 12, and 13 are thus driven in order to adjust the positional relationships of the sheet interceptors to the projectors. Consequently, the luminance on the screen is adjusted and made even.

When the light level adjustment liquid crystal panel employed in the fifth embodiment is adopted as a light level adjusting means, the control unit 42 causes the driver to extend electric control.

The sixth embodiment provides nearly the same advantages as the aforesaid first to fifth embodiments do. In addition, to adjust luminance when a lamp is replaced with a new one, or when any other repair is performed, an image on the screen should merely be picked up using a digital camera or the like. The adjustment is achieved automatically. The work time can therefore be reduced.

In this invention, it is apparent that a wide range of different working modes can be formed based on this invention without a departure from the spirit and scope of the invention. This invention is not restricted to any specific embodiment but limited to the appended claims.

What is claimed is:

1. A multi-display device comprising:
   a plurality of image projecting means for projecting partial images on a screen so as to construct one image as a whole, the projected partial images overlapping to have edges thereof superposed on edges of adjoining partial images in shared fields on the screen; and
   a light level adjusting means for adjusting an amount of light to be projected on each shared field so that the luminance level in the shared field will agree with the luminance levels in fields other than the shared fields, and for displacing a light level adjustment range within which an amount of light representing one edge of each partial image to be projected is adjusted relative to an amount of light representing the other edge thereof.

2. A multi-display device according to claim 1, wherein said light level adjusting means displaces the light level adjustment ranges within which amounts of light rays representing a plurality of edges of a partial image to be projected are adjusted, and the directions of displacements include two or more mutually independent directions and a direction of pivoting which are defined on a plane that crosses light projected from said image projecting means.

3. A multi-display device according to claim 1, wherein at least one of said plurality of image projecting means is located so that a direction in which the image projecting means projects an image will cross a normal to the major surface of said screen, and said light level adjusting means displaces the light level adjustment range so as to adjust an amount of light representing a difference between a partial image to be projected from the image projecting means and a partial image to be projected therefrom in the direction of the normal to the major surface of said screen.

4. A multi-display device according to claim 1, wherein said light level adjusting means has a portion thereof shaped for substantially conforming the luminance in a shared field, in which partial images projected from three or more image projecting means have corners thereof superposed on one another, with the luminance levels in fields other than the shared fields.

5. The multi-display device according to claim 4, wherein the portion is shaped as a triangle.

6. A multi-display device according to claim 1, wherein said light level adjusting means includes one or more sheet interceptors each intercepting at least part of light to be projected on a shared field on the screen, and at least one sheet interceptor is made movable.

7. A multi-display device according to claim 1, wherein said light level adjusting means includes one or more dim filters each having the transmittance or reflectance thereof increased continuously or stepwise from the edge of each filter to the center thereof, and at least one dim filter is made movable.

8. A multi-display device according to claim 1, wherein said image projecting means includes a display device for displaying an image, an illuminating means for illuminating the display device, and a projecting optical system for projecting an image on the display device illuminated by the illuminating means, and said light adjusting means includes a light level adjustment liquid crystal panel that is located on a light path linking said illuminating means and said projecting optical system, and that performs at least one of switching of interception of light, which is projected on a shared field, and transmission thereof, and changing of transmittance levels.

9. A multi-display device according to claim 1, further comprising a locking means for locking said light level adjusting means and said image projecting means as one united body so that said light level adjusting means and said image projecting means can maintain a predetermined positional relationship.

10. The multi-display device according to claim 9, wherein the light level adjusting means is located external to the projector.

11. A multi-display system comprising:
    a multi-display device including a plurality of image projecting means for projecting partial images on a screen so as to construct one image as a whole, the partial images overlapping to have the edges thereof superposed on edges of adjoining partial images in shared fields on the screen, and a light level adjusting means for adjusting an amount of light to be projected on each shared field so that the luminance level in the shared field will agree with the luminance levels in fields other than the shared fields, and for displacing a light level adjustment range within which an amount of light representing one edge of each partial image to be projected is adjusted relative to an amount of light representing the other edge thereof;
    an imaging means for picking up an image displayed on the screen of said multi-display device;
    a luminance detecting means for sampling a luminance signal from an image signal produced by said imaging means so as to detect the sizes of the shared fields and the luminance levels in the shared fields;
    a magnitude-of-displacement calculating means for calculating a magnitude of displacement, by which said light level adjusting means should displace the light level adjustment range, according to an output of said luminance detecting means; and
    a control means for extending control so that said light level adjusting means will displace the light level adjustment range by the magnitude of displacement calculated by said magnitude-of-displacement calculating means.

12. The multi-display system according to claim 11 wherein the image projecting means are located on a first side of the screen and the imaging means are located on a second side of the screen.

13. An adjusting method for a multi-display device comprising a plurality of image projecting means for projecting partial images on a screen so as to construct one image as a whole, the partial images overlapping to have the edges thereof superposed on edges of adjoining partial images in shared fields on the screen, and a light level adjusting means for adjusting an amount of light to be projected on each shared field so that the luminance level in the shared field will agree with the luminance levels in fields other than the shared fields, and for displacing a light level adjustment range within which an amount of light representing one edge of each partial image is adjusted relative to an amount of light representing the other edge thereof, said adjusting method comprising the steps of:
    picking up an image displayed on the screen of said multi-display device and outputting an image signal;
    sampling a luminance signal from the image signal so as to detect the sizes of the shared fields and the luminance levels in the shared fields;
    calculating a magnitude of displacement, by which said light level adjusting means included in said multi-display device should displace the light level adjustment range according to detected information of the sizes of the shared fields and the luminance levels in the shared fields; and
    extending control so that said light level adjusting means will displace the light level adjustment range by the magnitude of displacement.

* * * * *